Figure 13:
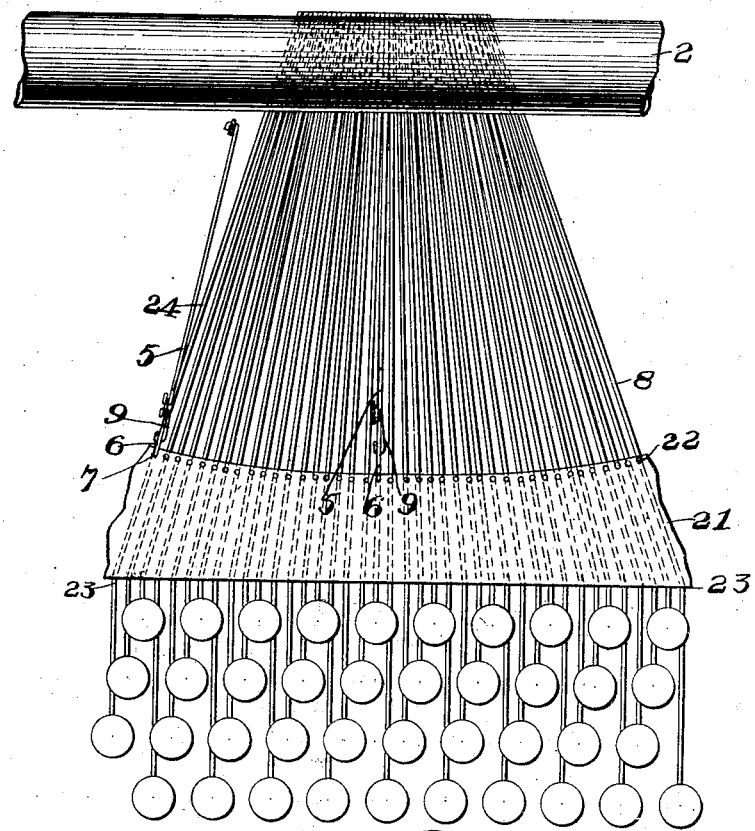

No. 831,511. PATENTED SEPT. 18, 1906.
E. B. HESS & L. C. MYERS.
WRITING MACHINE.
APPLICATION FILED NOV. 11, 1901.
4 SHEETS—SHEET 1.
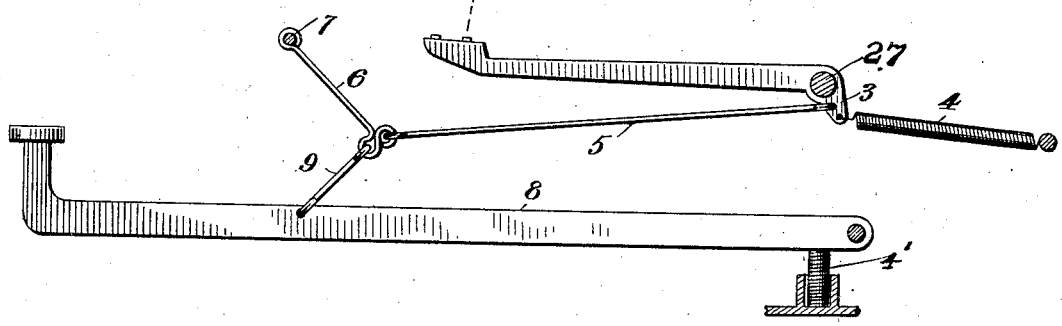
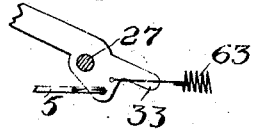
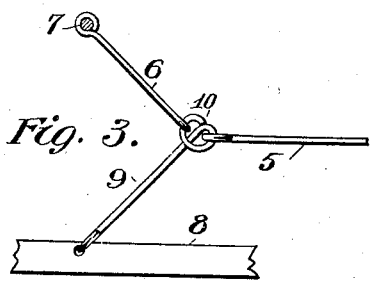
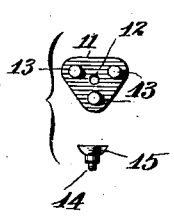
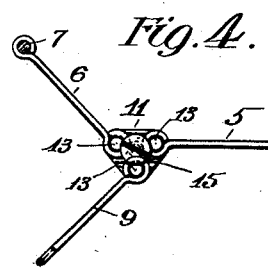
WITNESSES:
L. L. Browning
William A. Stahlin.
INVENTORS
Edward B. Hess
Lewis C. Myers
BY
Baldwin, Davidson & Wight
ATTORNEYS No. 831,511. PATENTED SEPT. 18, 1906.
E. B. HESS & L. C. MYERS.
WRITING MACHINE.
APPLICATION FILED NOV. 11, 1901.
4 SHEETS—SHEET 2.
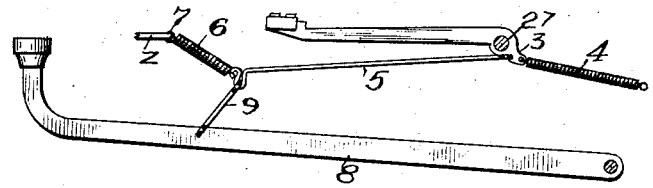
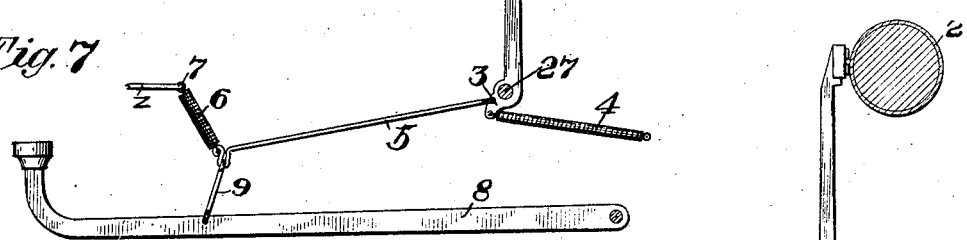
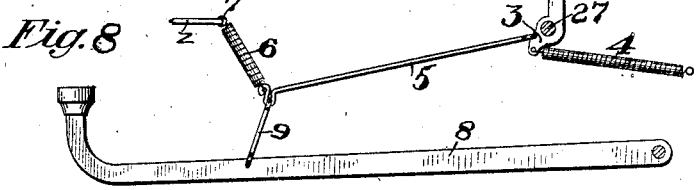
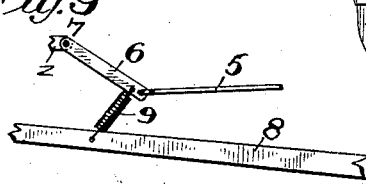
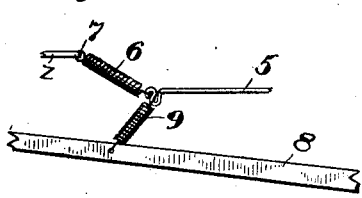
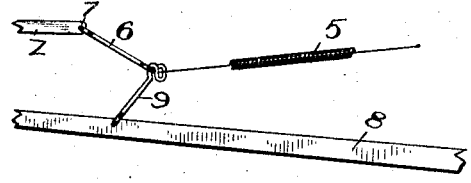
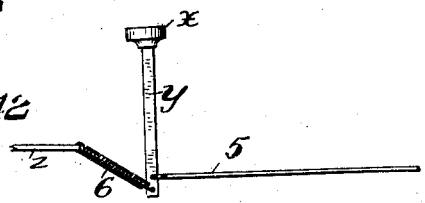

No. 831,511. PATENTED SEPT. 18, 1906.
E. B. HESS & L. C. MYERS.
WRITING MACHINE.
APPLICATION FILED NOV. 11, 1901.

4 SHEETS—SHEET 3.

Witnesses
Edward B. Hess
Lewis C. Myers
Inventors
By their Attorneys
Baldwin, Davidson & Wight No. 831,511. PATENTED SEPT. 18, 1906.
E. B. HESS & L. C. MYERS.
WRITING MACHINE.
APPLICATION FILED NOV. 11, 1901.

4 SHEETS—SHEET 4.

Witnesses
Edward B. Hess
Lewis C. Myers
Inventors
By their Attorneys

UNITED STATES PATENT OFFICE.

EDWARD B. HESS AND LEWIS C. MYERS, OF BROOKLYN, NEW YORK, ASSIGNORS, BY MESNE ASSIGNMENTS, TO ROYAL TYPEWRITER COMPANY, OF HOBOKEN, NEW JERSEY, A CORPORATION OF NEW JERSEY.

WRITING-MACHINE.

No. 831,511.  Specification of Letters Patent.  Patented Sept. 18, 1906.

Application filed November 11, 1901. Serial No. 81,886.

*To all whom it may concern:*

Be it known that we, EDWARD B. HESS and LEWIS C. MYERS, citizens of the United States, and residents of the borough of Brooklyn, city and State of New York, have invented certain new and useful Improvements in Writing-Machines, of which the following is a specification.

This invention is in part an improvement upon the construction disclosed in United States application of Edward B. Hess, filed August 27, 1901, Serial No. 73,460, wherein is claimed a flexing connection associated with a key-lever for actuating the type-bar.

One object of the present invention is to provide a proper depth of depression of the finger-piece and key-lever, while preserving a proper delicacy or softness of touch.

A further object is to provide a yielding or elastic cushion for the finger-piece that is brought into effective operation after the type-bar has impinged upon the platen. This part of the invention is applicable generally to writing-machines, wherein flexing connections for operating the type-bars are employed, as shown herein, and in the patents of Edward B. Hess, Nos. 679,673 and 679,675, dated July 30, 1901, Hess and Stoughton, No. 679,674, dated July 30, 1901, and Edward B. Hess, No. 700,687, dated May 20, 1902.

The invention also comprehends a new arrangement or association of type-bars and universal bar wherein the latter is actuated by the heel or projection of the type-bar beyond its pivot, as hereinafter set forth, and also certain arrangements of the type-bar actuating-links, an angular arrangement of the rear links or parts of the flexing connections combined in a visible-writing machine with a stationary type-bar segment and shifting platen, and a new construction of type-bar spring.

The invention may best be understood after reference to the accompanying drawings, in which—

Figures 14, 15:
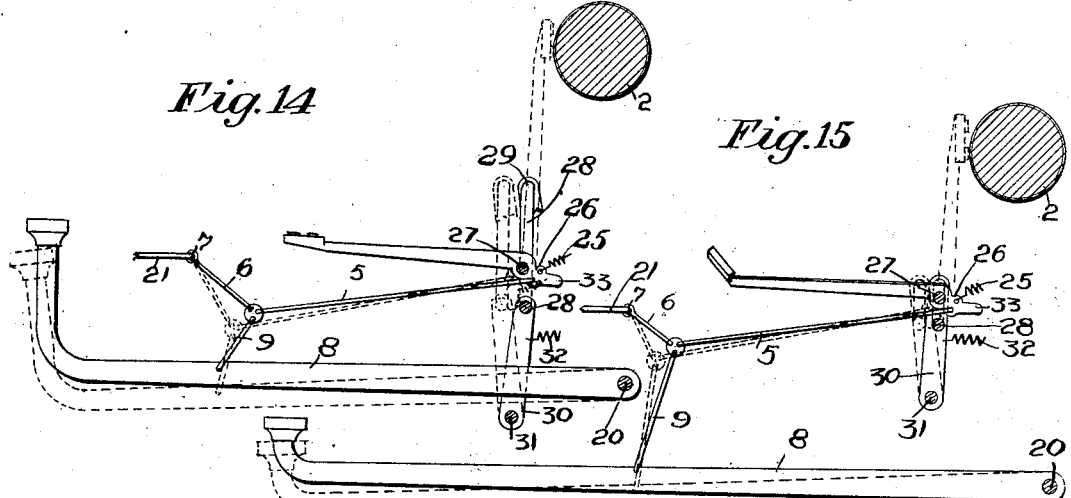
Figure 16:
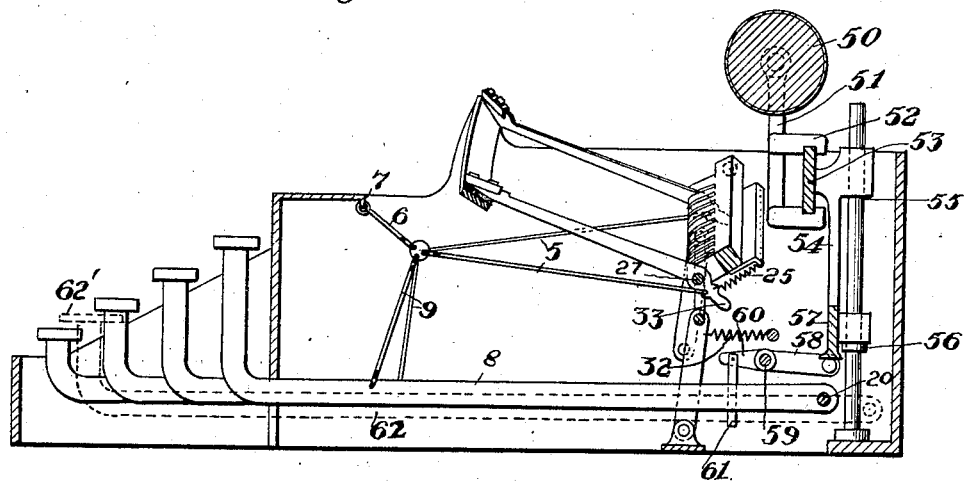
Figure 17:
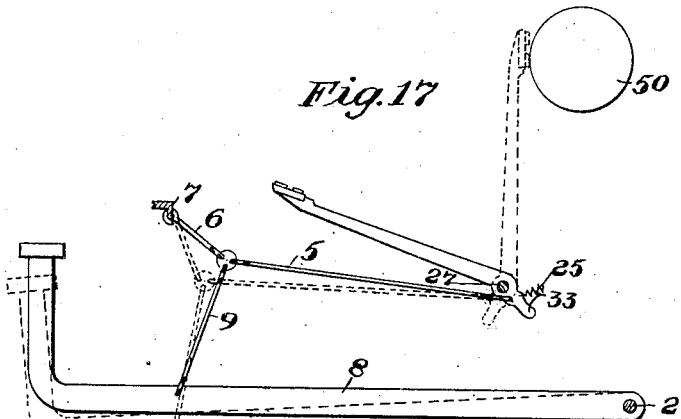
Figure 18:
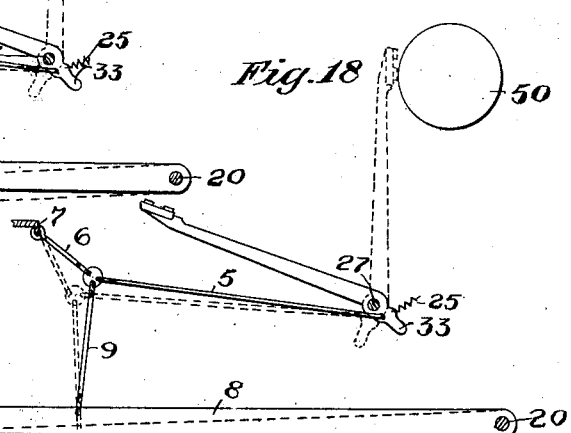

Figure 1 is a view showing a platen, a single type-bar, a key-lever, and the type-bar-actuating connections. Fig. 2 shows a slightly different arrangement or relation of the actuating-links; Fig. 3, a different mode of flexibly connecting the links; Fig. 4, still another way of connecting them; Fig. 5, a detail of the link-connecting devices shown in Fig. 4; Figs. 6 to 11 are views showing a like arrangement of links, but wherein some of the links are shown as coiled springs. Fig. 12 shows a flexing connection operated by a finger-piece above it, a key-lever not being employed, and part of the flexing connection being shown as a coiled spring. Fig. 13 is a plan view showing the key-levers and platen and a central and end flexing connection for actuating corresponding type-bars. Fig. 14 is a detail section showing a center key whose finger-piece is in the rear row, its corresponding flexing connection and type-bar and the universal bar. Fig. 15 is a like view showing an end key whose finger-piece is in the front row. Fig. 16 is a longitudinal section through a machine, showing only such details as are desirable to illustrate the invention, and indicating the preferred arrangement of the flexing connections relatively to the fixed type-bar segment. Figs. 17 and 18 are detail views showing a plan of securing uniform finger-piece depression that differs from that illustrated in Figs. 14 and 15. Figs. 19 and 20 are detail views showing an improved construction of type-bar spring.

The type-bars are shown as having two characters, and hence it is contemplated that either the platen 2 or type-bar support (which may be the usual comb or slotted segment) is to be shifted. If the requisite number of bars were provided in two series, such a shift would be unnecessary. This is all well understood in this art.

Referring first particularly to Figs. 1 to 5, inclusive, the heel or projection 3 of the type-bar may have attached to it a spring 4, whose function is well understood, or a spring of appropriate character may be applied to any suitable point in the mechanism, a second one being shown applied under the key-lever, as at 4', Fig. 1. To the projection 3 is also hinged the rear end of a link 5, whose front end is flexibly coupled with the rear end of a second link 6, whose front end is attached to a fixed point 7. If the flexing connection 5 6 be flexed downwardly, obviously the type-bar, which may normally lie horizontally, will be thrown upwardly and forwardly to the printing-point at the front face of the platen by a pull and with an increasing velocity. In a plane below the type-bar is a pivoted key-lever 8, having the usual finger-piece, and from the key-lever a link 9 extends to the joint between 5 and 6. The links 5 6 might be disposed substantially in a horizontal line; but that would require an increased depression of the key-lever or perhaps an undesirable shortness of the front link 6. For this reason the link 6 is inclined downwardly, as shown. If, now, the link 9 should extend from the hinge connection to the key-lever in a vertical line or its lower end should be but slightly in front of its upper end, the angle included between 6 and 9 would be of such dimensions that the touch of the key-lever might be too hard to satisfy existing requirements in the type-writer art. We have found that by connecting the link 9 at the hinge connection between links 5 and 6 and inclining it forward to the point of connection with the key-lever at a material angle to the vertical line suggested the required movement of the type-bar may be effected and the necessary softness of touch of the key-lever preserved. The initial movement of the finger-piece or key-lever will oppose less resistance to the finger of the operator when the link 9 is disposed at right angles, or substantially so, to the link 6, and therefore we prefer that these two members should normally stand ninety degrees apart or at least at an angle not materially greater than that. The angle may be somewhat less, as shown in Fig. 2. If the angle of the link 9 to the horizontal plane of the machine be forty-five degrees, it will be found that the link 6 may be disposed at an angle suitable to effect the required movement of the type-bar, while the desired character of "touch" may be preserved. We prefer the arrangement shown in Figs. 1, 3, and 4, where the links 6 and 9 are ninety degrees apart and are respectively at an angle of forty-five degrees to the horizontal plane of the machine. This will afford a finger-piece depression of about one-half an inch, which is standard. When the links 6 and 9 are disposed generally in the relation suggested, the type-bar is started into action under favorable conditions, and the increase of the angle between 5 and 6 on the further depression of the finger-piece or key-lever is not such as to cause a noticeable or practically objectionable increase in hardness of the touch. In the arrangement shown the link 5 is separated from the links 6 and 9 by substantially equal angles, and all three links are subjected to tensile strain only. The end of one of the links 5 6 (the latter one being so shown in Fig. 1) is bent into 8 shape or is formed with two loops or eyes, with which eyes at the ends of the links 5 and 9, respectively, engage. In Fig. 3 the end of the link 9 is bent back upon itself, then across, and finally back again to form loops or eyes 10, with which eyes on the ends of the links 5 and 6 engage. In Figs. 4 and 5 the ends of the links 5, 6, and 9 are united by a coupling-plate 11, having triangularly-disposed about a central point or aperture 12 three posts or bosses 13, over which loosely slip the eyes at the ends of the links, which are retained in position by a guard or headed bolt 14, screwing into the central aperture 12. The under face 15 of the bolt-head is inclined, as shown, to allow twisting or play of the eyes at the ends of the links to relieve torsional strain, particularly of those links that actuate the end type-bars of the machine.

The second part of this invention is illustrated in Figs. 6 to 12. In Fig. 6 the link 6 is a coiled spring adapted to swing freely about point 7 and of such stiffness as not to yield materially, if at all, during the excursion of the type-bar to the printing-point; but thereafter it will yield and so cushion the finger-piece at the bottom of the its stroke. Fig. 7 shows the finger-piece and key-lever depressed sufficiently to bring the type-bar against the platen, and Fig. 8 shows a further depression under the stress of which the spring-link 6 is extended. This construction gives a soft cushion touch to the finger-piece, the advantage of which is well understood. Any one or all of the three links 5 6 9 may be in whole or in part a spring. In Fig. 9 the link 9 is shown as a spring. In Fig. 10 links 6 and 9 are springs. In Fig. 11 link 5 is a spring. The arrangement of links in Figs. 6, 7, 8, 10, and 11 is the same as in Figs. 1 to 4, and, as has already been described, with the mere addition to the structure of the spring feature for cushioning the finger-piece at the bottom or lower part of its stroke. In Fig. 12 the flexing connection composed of the links 5 6 is actuated by a finger-piece $x$ above it and appropriately connected thereto, as by the stem $y$.

It is not contemplated that the spring link or member shall serve to return the type-bar from the platen. Nor is it in all respects requisite that the yielding spring affording the cushion effect described should be one of the links in whole or in part, since the fixed piece or point to which the front link is attached may yield. For instance, in Figs. 6 to 12 the part marked $z$, which is to be appropriately secured to the frame, may yield or may itself be a spring of such capacity as to afford the desired cushion effect.

We do not broadly claim as our invention a flexing type-bar-actuating connection of the general character shown and operated upon intermediate its ends, nor such a connection in a front-stroke machine, as such subject-matter, so far as it is claimable in view of the prior art, is the invention of Edward B. Hess. This invention is limited to certain special subjects-matter disclosed in the specification and claims.

Referring to Figs. 13, 14, and 15, it will be observed that the various key-levers 8 are pivoted at 20 toward the rear of the machine and substantially under the platen. This is a convenient and desirable location of the key-lever pivot-axis, but is not a necessary one, as the location may be changed. The front links 6 of the various flexing connections are respectively connected by swiveling joints with a plate 21, arranged transversely above the key-levers and adjacent the rear row of finger-pieces, the plate being provided with a series of apertures 22 to receive the hooks or eyes formed at the ends of the links 6. The line in which the apertures 22 lie might be a straight transverse one; but it is preferred for some reasons that it be somewhat curved and that the concave side be turned toward the platen. Various key-levers 8 are arranged at the rear as closely together as is desirable and diverge toward the front of the machine to a transverse line located in front of the series of apertures 22. They then extend straight forward and are equipped with finger-pieces arranged in straight transverse rows in a substantially rectangular bank. The bend or angle 23 in each key-lever where the direction of the lever changes from an angular or divergent one to one longitudinally of the machine is preferably a considerable or material distance in front of the line of apertures 22 in the plate 21. The links 9, therefore, are all connected with the divergent parts 24 of the key-levers. This is a desirable feature of this invention, as it permits of the rear portions of the key-levers being arranged substantially in line below their corresponding flexing connections, so that there is a minimum of torsional or lateral strain of the connections between the key-levers and type-bars.

To afford a uniform depth of depression of the various finger-pieces, the front links 6 of the flexing connections corresponding with and connected to the longer key-levers may be made shorter than the links 6 in the connections corresponding with the shorter key-lever. This is illustrated in Figs. 14 and 15, which show, respectively, one of the shortest and one of the longest key-levers. The intermediate key-levers of two different lengths will be connected with flexing connections having front links 6 of proportionate length. A spring 25 may be applied to the heel or projection 26 of each type-bar. The type-bars are to be mounted in the usual segment, which, however, is omitted from the drawings for the sake of clearness. The ordinary pivot rod or wire upon which the various type-bars may be mounted to rock is shown in Figs. 14 and 15 and other figures, being marked 27. It is of course of segmental contour, corresponding with the curve of the segment; but it is only shown in section. Beneath the pivots of the type-bars is mounted a universal bar 28, which is curved to conform to the curve in which the respective type-bar pivots lie and is supported by three vertical links, one, 29, at each end, and another, 30, in the middle, and all of which are attached to a rock-shaft 31, that may be appropriately mounted in bearings in the sides of the frame. A spring 32 applied to this universal bar may be attached to the arm or link 30, as in Figs. 14 and 15. The projections or heels 26 of the several type-bars are so shaped or are formed with an extended part 33 that they strike against the universal bar 28 when thrown to the printing-point. The type-bar, which is weighted more or less at its outer or free end by the type-carrying head, moves freely under the stress of the flexing connection through the greater part of its excursion toward the printing-point and acquires a considerable momentum. While thus moving, the heel of the type-bar or the part 33 thereof strikes the universal bar and forces it forward, as indicated by the dotted line. The blow or impact of the part 33 against the universal bar is delivered with hammer-like effect and the universal bar is moved without impairing, at least to a disadvantageous extent, the impact of the type upon the platen. With the general form of type-bar-actuating device herein illustrated there is a rise in the velocity of the type-bar from its initial movement until it impinges against the platen, and the rise in velocity is most rapid during the latter part of the excursion of the type-bar. This fact makes particularly advantageous the conjoint use of such type-bar-actuating devices and a universal bar actuated as described. As the universal bar is below the type-bar pivots and is thrown forward by impact of the type-bar heels, not only is the momentum of the type-bars used to most advantage, but the movement of the universal bar may be transmitted to the devices to be actuated by light links or devices which are required to resist tensile strain only. Moreover, with this construction there is no danger of bending the type-bar by reason of the repeated impacts against the universal bar, and the point of pull upon the type-bar is on the same side of the type-bar pivot as the point of impact against the universal bar, and these two points are comparatively close together. These are important practical considerations. Owing to the character of the blow of the part 33 upon the universal bar 28 the spring 32, applied as shown or elsewhere, may be a comparatively stiff one and of considerably greater strength than the spring 25. Experience has demonstrated that the spring 32 may be of such strength as on the completion of the stroke of the finger-piece by its reaction to throw up the finger-piece while the finger of the operator is still upon it. The effect, therefore, is under the circumstances for the spring 32 to move and hold the type-bar away from the platen immediately after the moment of the impact, and thus prevent vibration of the type upon the platen-surface.

The universal bar may be connected to the carriage and ribbon devices in any suitable or well-known way.

The front ends of the front links 6 in the special construction shown are arranged in a single transverse line, or substantially so, and are in the same horizontal plane, or substantially so. This line is preferably located above a horizontal plane midway between like planes bounding the bottom and upper ends of the curved series of type-bar pivots or the curve in which the points of connection between the rear links 5 and type-bars lie. The rear ends of the front links 6, which extend downwardly, will be approximately in said midway horizontal plane, and the rear links will extend therefrom in varying angular directions to their respective type-bars. This is indicated in Fig. 16. When the machine is constructed with front links 6 of different lengths to afford uniform depth of depression of the finger-pieces, their rear ends will or need not lie in one horizontal line, but nevertheless the rear links 5 will be disposed at varying angles substantially as stated. If the rear ends of front links of varying length are arranged in the same horizontal plane, then either the angle of the links must be varied or their front ends must be disposed in varying horizontal planes. This general disposition of the rear links, combined with a fixed type-bar support and a shifting platen, constitutes a feature of the present invention and is distinguished from a construction, such as shown in the application of Edward B. Hess, Serial No. 57,588, filed April 26, 1901, wherein the front fixed point of each flexing connection is in line horizontally substantially with the point of attachment to its type-bar and a shifting segment and stationary platen are employed.

Any suitable shifting-platen organization may be adopted. That shown in Fig. 16 is a convenient and practical construction, but forms no part of this invention, being shown in an application of Edward B. Hess, Serial No. 73,570, filed August 28, 1901. The platen 50 is mounted on the carriage 51, having an appropriate number of grooved lugs 52, that embrace and travel upon the upper and lower edges of a flat plate or track 53, mounted in elongated vertical brackets 54, having rearwardly-extending lugs embracing and sliding upon vertical posts 55, suitably mounted in the frame. The lower position of the platen is determined by collars 56 on these posts. The brackets 54 and the cross plate or bar 57, connecting them at the bottom, constitute a frame which may be elevated by means of one or more arms 58, extending rearwardly from a rock-shaft 59, mounted in the side plates of the frame, and from the end of which at the left side of the machine projects forwardly an arm 60. A strap or link 61 connects this arm with a shift key or lever 62, having a finger-piece 62' applied to its upturned ends at the front of the machine. There may be one arm 58 at each side of the machine. The mode of operation is obvious and further description seems unnecessary.

Figs. 17 and 18 show an arrangement by which a uniform depth of depression of the finger-pieces is obtained while employing front links 6 of uniform length. This is accomplished by carrying the connection of the link 9 forward or toward the front end of the key-lever, as shown by Fig. 17 in comparison with Fig. 18.

Figs. 19 and 20 show a new form of type-bar spring by which a perfectly straight and symmetrical disposition of the strain and pull upon the type-bar is obtained. The coiled part 63 of the spring is a common construction. The end of the wire is formed into a loop 64, and its free end, which is hook-shaped, engages one or more of the convolutions of the spring, preferably at a point diametrically opposite the point from which the wire and extends from the convolutions for the formation of the loop. The end of the loop which occupies the aperture in the type-bar heel or projection is contracted and is preferably only of sufficient width to give a proper bearing without unnecessary friction in the aperture in the type-bar. When the type-bar moves to the printing-point, its heel or projection passes into or through the stirrup or loop 64. This construction affords an even or uniform strain on the type-bar and operates to reduce or entirely overcome torsion and friction with the end bars. This style of spring may be applied in all the modifications shown in the various figures in lieu of the ordinary springs therein shown and marked 4. This loop construction obviates any danger of collision of the heel or projection of the type-bar with the spring, since in all cases the projection must pass into and through the loop without possibility of collision with the sides thereof.

In the organization illustrated, with the exception of that shown in Fig. 9, all three of the angularly-disposed links 5 6 9 are subjected to tensile strain only. A further feature of the construction is the employment of universal joints in the following places, which are named in the order of their importance in the practical construction and operation of the writing-machine: that between the links 5 6, between the link 5 and type-bar, between the link 9 and the links 5 6, between the link 9 and the key-lever 8, and between the link 6 and its fixed point or support 7.

These universal joints afford a flexibility in action which eliminates torsional strains, particularly in the operation of the end keys.

We claim as our invention—

1. In a writing-machine, the combination of a pivoted type-bar, a key-lever in a plane below the type-bar, three links hinged together at their adjacent ends and their opposite ends connected one to the type-bar, another to the key-lever, and the third to a fixed point, the three links being so disposed that all are subjected to tensile strain only and the one connected to the type-bar is separated by substantially equal angles from the other two.

2. In a writing-machine, the combination of a pivoted type-bar, a link whose rear end is connected to the type-bar, a second link having its front end connected to a fixed point and its rear end hinged to the front end of the first link and which is inclined downward toward the key-lever, a key-lever in a plane below the two links, and a third link connecting the hinged ends of the other two links to the key-lever, all links being subjected to tensile strain only and said third link being disposed at an angle of forty-five degrees or thereabout, to the horizontal plane of the machine.

3. In a writing-machine, the combination of a pivoted type-bar, a link whose rear end is connected to the type-bar, a second link having its front end connected to a fixed point and its rear end hinged to the front end of the first link and which is inclined downward toward the key-lever, a key-lever in a plane below the two links, and a third link connecting the hinged ends of the other two links to the key-lever, all links being subjected to tensile strain only and said third link disposed at an angle of ninety degrees, or thereabout, to the front link attached to the fixed point.

4. In a writing-machine, the combination of a pivoted type-bar normally lying toward the front of the machine, a key-lever in a plane below the type-bar, three converging links one connected to the type-bar, another to a fixed point and the third to the key-lever, a coupling-plate having posts or bosses over which eyes at the convergent ends of the link pass and a guard applied to the plate to retain said eyes upon the posts.

5. In a writing-machine, the combination of a pivoted type-bar, a key-lever in a plane below the type-bar, three links hinged together at their adjacent ends and their opposite ends connected one to the type-bar, another to the key-lever, and the third to rock loosely about a fixed point, and one at least of which is a coiled spring whose direction of extension and reaction is coincident with its axis and which is capable of yielding longitudinally to cushion the key-lever at or near the bottom of its stroke and the three links being so disposed that the one connected to the type-bar is separated by substantially equal angles from the other two.

6. In a writing-machine, the combination of a pivoted type-bar, a key-lever in a plane below the type-bar, three links hinged together at their adjacent ends and their opposite ends connected one to the type-bar, another to the key-lever, and the third to rock loosely about a fixed point, and one at least of which is a coiled spring whose direction of extension and reaction is coincident with its axis and which is adapted to be extended to cushion the key-lever at or near the bottom of its stroke, the three links being so disposed that the one connected to the type-bar is separated by substantially equal angles from the other two.

7. In a writing-machine, the combination of a pivoted type-bar, a link whose rear end is connected to the type-bar, a second link having its front end connected to rock loosely about a fixed point and its rear end hinged to the front end of the first link and which is inclined downward toward the key-lever, a key-lever in a plane below the two links, and a third link connecting the hinged ends of the other two links to the key-lever and disposed at an angle of forty-five degrees, or thereabout, to the horizontal plane of the machine, one of said links being a coiled spring whose direction of expansion and reaction is coincident with its axis and which is adapted to yield longitudinally to cushion the key-lever at or near the bottom of its stroke.

8. In a writing-machine, the combination of a pivoted type-bar, a link whose rear end is connected to the type-bar, a second link having its front end connected to rock loosely about a fixed point and its rear end hinged to the front end of the first link and which is inclined downward toward the key-lever, a key-lever in a plane below the two links, and a third link connecting the hinged ends of the other two links to the key-lever and disposed at an angle of ninety degrees, or thereabout, to the front link attached to the fixed point, one of said links being a coiled spring whose direction of expansion and reaction is coincident with its axis and which is adapted to yield longitudinally to cushion the key-lever at or near the bottom of its stroke.

9. In a writing-machine, the combination of a pivoted type-bar, a key-lever, and interposed between the key-lever and type-bar means for actuating the type-bar comprising a flexing connection extending from the type-bar to a fixed point about which it loosely rocks, and a connection between the key-lever and such flexing connection, said means comprising a coiled spring capable of yielding elastically in the direction of its axis to cushion the key-lever at or near the bottom of its stroke.

10. In a writing-machine, the combination of a pivoted type-bar, a finger-piece for actuating it, and interposed between the type-bar and finger-piece means for actuating the type-bar, comprising a connection capable of being flexed intermediate its ends, extending from the type-bar to a fixed point near the front of the machine and composed of a coiled-spring link having a pivotal motion around the fixed point and a second link hinged to the first one and to the type-bar, and a connection between the finger-piece and such flexing connection intermediate the ends of the latter, said coiled-spring link being capable of yielding elastically longitudinally to cushion the key-lever at or near the bottom of its stroke, after the type-bar has reached the platen.

11. In a writing-machine, the combination of a platen, type-bars pivoted in a segmental line below the platen and adapted to strike against the front face thereof, pivoted key-levers disposed in a plane below the type-bars and forming a divergent series from their pivots toward the front of the machine but the front ends of which are parallel with each other and with the longitudinal center line of the machine, flexing connections, one for each type-bar, located entirely above the key-levers and extending in a generally horizontal direction from and under the type-bar toward the front of the machine and each composed of two links hinged together, the rear end of the rear link being connected to its type-bar, and the front end of the front link to a fixed axis, and a link connecting each flexing connection with its key-lever in rear of the parallel front portions of the key-levers.

12. In a writing-machine, a series of pivoted type-bars each having a projection extending beyond its pivot, means for operating the bars and platen against which they strike, in combination with a universal bar against which each such projection strikes after its type-bar has completed the major part of its excursion to the printing-point, and a spring applied to the universal bar of such strength as by its reaction to draw each type-bar out of contact with the platen while the finger of the operator still dwells upon its finger-piece.

13. In a writing-machine, a series of pivoted type-bars each having a projection extending beyond its pivot in a direction opposite substantially to the position occupied by the body of the type-bar, means for operating the type-bars and the platen against which they strike, in combination with a universal bar located below the series of type-bar pivots and in position to be struck by such projections during the excursion of the type-bars to the printing-point, and a spring applied to the universal bar of such strength as by its reaction to draw each type-bar out of contact with the platen while the finger of the operator still dwells upon its finger-piece.

14. In a writing-machine, a series of pivoted type-bars whose pivots are arranged in a curve or segment and each of which has a projection extending beyond its pivot, means for operating the type-bars, a platen located above the type-bar pivots and against the front face of which the type-bars strike, in combination with a universal bar located below the series of type-bar pivots in position to be struck by said projections during the excursion of the type-bars to the printing-point and a spring applied to the universal bar of such strength as by its reaction to draw each type-bar out of contact with the platen while the finger of the operator still dwells upon its finger-piece.

15. In a writing-machine, a platen, type-bars pivoted in a curve or segment in a plane below the platen, normally lying toward the front of the machine and each having a projection extending beyond its pivot toward the rear of the machine, flexing connections arranged below the type-bars and respectively connected at their rear ends to their corresponding type-bars and at their front ends to fixed points, means for flexing such connections to throw the type-bars to the printing-point and a universal bar located below the series of type-bar pivots in a position to be struck by said projections during the excursion of the type-bars to the printing-point.

16. In a writing-machine, a platen, a series of type-bars pivoted in a curve or segment adapted to strike against the front face of the platen and each having a projection extending rearwardly beyond its pivot, a flexing connection extending from each type-bar to a fixed point, key-levers and connections between the key-levers and the corresponding flexing connections to throw the type-bar to the printing-point with an increasing velocity and a universal bar with which such projections come in contact during the excursions of the type-bars to the printing-point.

17. In a writing-machine, a platen, type-bars pivoted in a curve or segment in a plane below the platen, normally lying toward the front of the machine and each having a projection extending beyond its pivot toward the rear of the machine, flexing connections arranged below the type-bars and respectively connected at their rear ends to their corresponding type-bars and at their front ends to fixed point, key-levers and connections between the key-levers and the corresponding flexing connections to throw the type-bars to the printing-point and a universal bar located below the series of type-bar pivots in a position to be struck by said projections during the excursion of the type-bars to the printing-point.

18. In a writing-machine, a platen, a series of type-bars pivoted in a curve or segment adapted to strike against the front face of the platen and each having a projection extending rearwardly beyond its pivot, a flexing connection extending from each type-bar to a fixed point, means for flexing each such connection to throw the type-bar to the printing-point with an increasing velocity, a universal bar located below the type-bar pivots with which such projections come in contact during the excursion of the type-bars to the printing-point and a spring applied to the universal bar of such strength as by its reaction to draw each type-bar out of contact with the platen while the finger of the operator still dwells upon its finger-piece.

19. In a writing-machine, a platen, type-bars pivoted in a curve or segment in a plane below the platen, normally lying toward the front of the machine and each having a projection extending beyond its pivot toward the rear of the machine, flexing connections arranged below the type-bars and respectively connected at their rear ends to their corresponding type-bars and at their front ends to fixed points, means for flexing such connections to throw the type-bars to the printing-point, a universal bar located below the series of type-bar pivots in a position to be struck by said projections during the excursion of the type-bars to the printing-point and a spring applied to the universal bar of such strength as by its reaction to draw each type-bar out of contact with the platen while the finger of the operator still dwells upon its finger-piece.

20. In a writing-machine, a platen, a series of type-bars pivoted in a curve or segment adapted to strike against the front face of the platen and each having a projection extending rearwardly beyond its pivot, a flexing connection extending from each type-bar to a fixed point, key-levers and connections between the key-levers and the corresponding flexing connections to throw the type-bar to the printing-point with an increasing velocity, a universal bar with which such projections come in contact during the excursions of the type-bars to the printing-point and a spring applied to the universal bar of such strength as by its reaction to draw each type-bar out of contact with the platen while the finger of the operator still dwells upon its finger-piece.

21. In a writing-machine, a platen, type-bars pivoted in a curve or segment in a plane below the platen, normally lying toward the front of the machine and each having a projection extending beyond its pivot toward the rear of the machine, flexing connections arranged below the type-bars and respectively connected at their rear ends to their corresponding type-bars and at their front ends to fixed points, key-levers and connections between the key-levers and the corresponding flexing connections to throw the type-bars to the printing-point, a universal bar located below the series of type-bar pivots in a position to be struck by said projections during the excursion of the type-bars to the printing-point and a spring applied to the universal bar of such strength as by its reaction to draw each type-bar out of contact with the platen while the finger of the operator still dwells upon its finger-piece.

22. In a writing-machine, the combination of a platen, a series of type-bars pivoted in a curve or segment and adapted to strike against the front face of the platen, a series of flexing connections one for each type-bar each connected at its rear to a type-bar and at the front end to a fixed point and composed of two links hinged together at their adjacent ends, the front links being of unequal length, a series of key-levers of unequal length arranged below the flexing connections and connections between the key-levers and the front links, the longer key-levers being connected to the shorter front links.

23. In a writing-machine, the combination of a platen, a series of type-bars pivoted in a curve or segment and adapted to strike against the front face of the platen, a series of flexing connections one for each type-bar each connected at its rear to a type-bar and at the front end to a fixed point and composed of two links hinged together at their adjacent ends the front links being of unequal length and extending downwardly and rearwardly, a series of key-levers of unequal length arranged below the flexing connections and connections between the key-levers and the front links, the longer key-levers being connected to the shorter front links.

24. In a writing-machine, the combination of a platen, a series of type-bars pivoted in a curve or segment and adapted to strike against the front face of the platen, a series of flexing connections one for each type-bar each connected at its rear to a type-bar and at the front end to a fixed point and composed of two links hinged together at their adjacent ends, the front links being of unequal length, a series of key-levers of unequal length arranged below the flexing connections and connections between the key-levers and the hinge of their corresponding flexing connections, the longer key-levers being connected to the shorter front links.

25. In a writing-machine, the combination of a platen, a series of type-bars pivoted in a curve or segment and adapted to strike against the front face of the platen, a series of flexing connections one for each type-bar each connected at its rear to a type-bar and at the front end to a fixed point and composed of two links hinged together at their adjacent ends, the front links being of unequal length and extending downwardly and rearwardly, a series of key-levers of unequal length arranged below the flexing connections and connections between the key-levers and the hinge of their corresponding flexing connections, the longer key-levers being connected to the shorter front links.

26. In a writing-machine, the combination of a platen, a series of type-bars pivoted in a curve or segment and adapted to strike against the front face of the platen, a series of flexing connections one for each type-bar each connected at its rear to a type-bar and at the front end to a fixed point, all such fixed points being arranged in a horizontal plane, and composed of two links hinged together at their adjacent ends, the front links being of unequal length, a series of key-levers of unequal length arranged below the flexing connections and connections between the key-levers and the front links, the longer key-levers being connected to the shorter front links.

27. In a writing-machine, the combination of a platen, a series of type-bars pivoted in a curve or segment and adapted to strike against the front face of the platen, a series of flexing connections one for each type-bar each connected at its rear to a type-bar and at the front end to a fixed point, all such points being arranged in a horizontal plane, and composed of two links hinged together at their adjacent ends the front links being of unequal length and extending downwardly and rearwardly, a series of key-levers of unequal length arranged below the flexing connections and connections between the key-levers and the front links, the longer key-levers being connected to the shorter front links.

28. In a writing-machine, the combination of a platen, a series of type-bars pivoted in a curve or segment and adapted to strike against the front face of the platen, a series of flexing connections one for each type-bar each connected at its rear to a type-bar and at the front end to a fixed point, all such fixed points being arranged in a horizontal plane, and composed of two links hinged together at their adjacent ends, the front links being of unequal length, a series of key-levers of unequal length arranged below the flexing connections and connections between the key-levers and the hinge of their corresponding flexing connections, the longer key-levers being connected to the shorter front links.

29. In a writing-machine, the combination of a platen, a series of type-bars pivoted in a curve or segment and adapted to strike against the front face of the platen, a series of flexing connections one for each type-bar each connected at its rear to a type-bar and at the front end to a fixed point, all such points being arranged in a horizontal plane, and composed of two links hinged together at their adjacent ends, the front links being of unequal length and extending downwardly and rearwardly, a series of key-levers of unequal length arranged below the flexing connections and connections between the key-levers and the hinge of their corresponding flexing connections, the longer key-levers being connected to the shorter front links.

30. In a writing-machine, the combination of a platen, a series of type-bars pivoted in a curve or segment and adapted to strike against the front face of the platen, and a series of flexing connections one for each type-bar each connected at the rear end to its type-bar and at the front end to a fixed point and composed of two links united at their adjacent ends by a hinge connection, such hinge connections being each disposed in a general horizontal direction and located between horizontal planes bounding the bottom and upper ends of the curve in which the points of connection between the type-bars and the flexing connections lie and the rear links of such flexing connections being therefore disposed in varying angular directions, and means for shifting the platen.

31. In a writing-machine, the combination of a platen, a vertically-arranged type-bar segment, type-bars pivoted therein and adapted to strike against the front face of the platen, links connected at their rear ends to the respective type-bars and extending forward under the type-bars and in front of the type-bar pivots in various angular directions according to the position of the type-bar in the segment, front links respectively hinged at their rear ends to said rear links, extending forwardly therefrom and connected at their front ends to fixed points, key-levers, operative connections between the key-levers and said front links and means for shifting the platen.

32. In a writing-machine, the combination of a platen, a vertically-arranged type-bar segment, type-bars pivoted therein and adapted to strike against the front face of the platen, links connected at their rear ends to the respective type-bars and extending forward in various angular directions according to the position of the type-bar in the segment, front links respectively hinged at their rear ends to said rear links and connected at their front ends to fixed points arranged substantially in a horizontal plane, key-levers, operative connections between the key-levers and said front links and means for shifting the platen.

33. In a writing-machine, the combination of a platen, a vertically-arranged type-bar segment, type-bars pivoted therein and adapted to strike against the front face of the platen, links connected at their rear ends to the respective type-bars and extending forward in various angular directions according to the position of the type-bar in the segment, front links respectively hinged at their rear ends to said rear links and connected at their front ends to fixed points arranged substantially in a horizontal plane, means for shifting the platen, and means for flexing the links on their hinge connection whereby the type-bars are thrown to the printing-point in either position of the platen.

34. In a writing-machine, the combination of a platen, a vertically-arranged type-bar segment, type-bars pivoted therein and adapted to strike against the front face of the platen, links connected at their rear ends to the respective type-bars and extending forward in various angular directions according to the position of the type-bar in the segment, front links of different lengths respectively hinged at their rear ends to said rear links and connected at their front ends to fixed points, key-levers, operative connections between the key-levers and said front links and means for shifting the platen.

35. In a writing-machine, the combination of a platen, a vertically-arranged type-bar segment, type-bars pivoted therein and adapted to strike against the front face of the platen, links connected at their rear ends to the respective type-bars and extending forward in various angular directions according to the position of the type-bar in the segment, front links of different lengths respectively hinged at their rear ends to said rear links and connected at their front ends to fixed points arranged substantially in a horizontal plane, key-levers, operative connections between the key-levers and said front links and means for shifting the platen.

36. In a writing-machine, the combination of a platen, a vertically-arranged type-bar segment, type-bars pivoted therein and adapted to strike against the front face of the platen, links connected at their rear ends to the respective type-bars and extending forward in various angular directions according to the position of the type-bar in the segment, front links of different lengths inclined rearwardly and downwardly respectively hinged at their rear ends to said rear links and connected at their front ends to fixed points, key-levers, operative connections between the key-levers and said front links and means for shifting the platen.

37. In a writing-machine, the combination of a platen, a vertically-arranged type-bar segment, type-bars pivoted therein and adapted to strike against the front face of the platen, links connected at their rear ends to the respective type-bars and extending forward in various angular directions according to the position of the type-bar in the segment, front links of different lengths inclined rearwardly and downwardly respectively hinged at their rear ends to said rear links and connected at their front ends to fixed points arranged substantially in a horizontal plane, key-levers, operative connections between the key-levers and said front links and means for shifting the platen.

38. In a writing-machine, the combination of a platen, a vertically-arranged type-bar segment, type-bars pivoted therein and adapted to strike against the front face of the platen, links connected at their rear ends to the respective type-bars and extending forward in various angular directions according to the position of the type-bar in the segment, front links respectively hinged at their rear ends to said rear links and connected at their front ends to fixed points, key-levers, a connection from each key-lever extending to the hinge-joint between its corresponding front and rear link and means for shifting the platen.

39. In a writing-machine, the combination of a platen, a vertically-arranged type-bar segment, type-bars pivoted therein and adapted to strike against the front face of the platen, links connected at their rear ends to the respective type-bars and extending forward in various angular directions according to the position of the type-bar in the segment, front links respectively hinged at their rear ends to said rear links and connected at their front ends to fixed points arranged substantially in a horizontal plane, key-levers, a connection from each key-lever extending to the hinge-joint between its corresponding front and rear link and means for shifting the platen.

40. In a writing-machine, the combination of a platen, a vertically-arranged type-bar segment, type-bars pivoted therein and adapted to strike against the front face of the platen, links connected at their rear ends to the respective type-bars and extending forward in various angular directions according to the position of the type-bar in the segment, front links of different lengths respectively hinged at their rear ends to said rear links and connected at their front ends to fixed points, key-levers, a connection from each key-lever extending to the hinge-joint between its corresponding front and rear link and means for shifting the platen.

41. In combination with a pivoted type-bar, a type-bar spring having a loop formed by the wire of which the spring is made and contracted at its end to approximately the width of the type-bar with which the loop engages.

42. The combination of a type-bar and a loop-spring connected with the heel thereof so that the heel may pass into or through the loop of the spring during its excursion to the printing-point.

43. The combination of a type-bar and its retracting-spring formed at the end attached to the type-bar with a loop into which a portion of the type-bar may enter.

44. In a writing-machine, a platen, type-bars pivoted in a curve or segment in a plane below the platen, normally lying toward the front of the machine and each having a projection extending beyond its pivot, a universal bar located below the series of type-bar pivots and normally out of contact with the projections on the type-bars but in a position to be struck by said projections during the excursion of the type-bars to the printing-point, and means for throwing the type-bars to the printing-point with an increasing velocity.

In testimony whereof we have hereunto subscribed our names.

EDWARD B. HESS.
LEWIS C. MYERS.

Witnesses:
KATHARINE MACMAHON,
EDWARD C. DAVIDSON.